United States Patent
Lee et al.

(10) Patent No.: US 11,381,494 B2
(45) Date of Patent: Jul. 5, 2022

(54) METHOD AND SYSTEM FOR PROVIDING COMMUNICATION ANALYSIS OF USER EQUIPMENT BASED ON NETWORK DATA ANALYSIS

(71) Applicant: ELECTRONICS AND TELECOMMUNICATIONS RESEARCH INSTITUTE, Daejeon (KR)

(72) Inventors: Soohwan Lee, Daejeon (KR); Myung Ki Shin, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/869,372

(22) Filed: May 7, 2020

(65) Prior Publication Data
US 2020/0358689 A1    Nov. 12, 2020

(30) Foreign Application Priority Data

May 7, 2019    (KR) .................. 10-2019-0053316
Jun. 13, 2019    (KR) .................. 10-2019-0070207
Nov. 22, 2019    (KR) .................. 10-2019-0151019
May 7, 2020    (KR) .................. 10-2020-0054222

(51) Int. Cl.
*H04L 43/50*       (2022.01)
*H04L 43/028*      (2022.01)
(Continued)

(52) U.S. Cl.
CPC ............ *H04L 43/50* (2013.01); *H04L 43/028* (2013.01); *H04L 43/04* (2013.01); *H04L 43/065* (2013.01);
(Continued)

(58) Field of Classification Search
CPC ..... H04W 48/18; H04W 40/24; H04W 4/029; H04W 4/50; H04W 4/60; H04W 12/02; H04W 12/37; H04W 12/72; H04W 12/76; H04W 12/08; H04W 64/00; H04W 68/04; H04W 72/085; H04L 43/04; H04L 43/028; H04L 43/0817; H04L 43/065; H04L 43/0894; H04L 43/06; H04L 43/08;
(Continued)

(56) References Cited

U.S. PATENT DOCUMENTS 6,215,771 B1    4/2001   Turner et al.
7,930,376 B2    4/2011   Levillain et al.
(Continued)

FOREIGN PATENT DOCUMENTS

WO     2019032968 A1    2/2019

OTHER PUBLICATIONS

E. Pateromichelakis et al., "End-to-End Data Analytics Framework for 5G Architecture," in IEEE Access, vol. 7, pp. 40295-40312, 2019, doi: 10.1109/ACCESS.2019.2902984. (Year: 2019).*

*Primary Examiner* — Glenton B Burgess
*Assistant Examiner* — Rachel J Hackenberg
(74) *Attorney, Agent, or Firm* — Rabin & Berdo, P.C.

(57) ABSTRACT

A method and a system for providing communication analysis of the user equipment (UE) based on network analysis is disclosed. The method provides communication analysis of the UE in a form as UE communication statistics or UE communication prediction by analyzing network data collected from the network function (NF) device.

14 Claims, 10 Drawing Sheets

(51) Int. Cl.
　　　*H04L 43/065*　　　(2022.01)
　　　*H04L 43/0817*　　(2022.01)
　　　*H04L 43/04*　　　(2022.01)
　　　*H04W 48/18*　　　(2009.01)
　　　*H04W 12/02*　　　(2009.01)
　　　*H04W 40/24*　　　(2009.01)
　　　*H04W 4/029*　　　(2018.01)

(52) U.S. Cl.
　　　CPC ......... *H04L 43/0817* (2013.01); *H04W 4/029* (2018.02); *H04W 12/02* (2013.01); *H04W 40/24* (2013.01); *H04W 48/18* (2013.01)

(58) Field of Classification Search
　　　CPC ............. H04L 43/0829; H04L 43/0852; H04L 43/087; H04L 43/0876; H04L 43/0882; H04L 43/50
　　　See application file for complete search history.

(56) References Cited

U.S. PATENT DOCUMENTS

| | | | |
|---|---|---|---|
| 2016/0165462 A1* | 6/2016 | Tan | H04W 24/02 |
| | | | 370/254 |
| 2017/0289984 A1* | 10/2017 | Baligh | H04L 1/1812 |
| 2018/0262924 A1* | 9/2018 | Dao | H04W 72/1257 |
| 2019/0050578 A1 | 2/2019 | Choi | |
| 2019/0155922 A1 | 5/2019 | Kim et al. | |
| 2019/0191330 A1* | 6/2019 | Dao | H04L 12/4633 |
| 2019/0222489 A1* | 7/2019 | Shan | H04L 12/1407 |
| 2020/0045753 A1* | 2/2020 | Dao | H04W 4/06 |
| 2020/0112868 A1* | 4/2020 | Shariat | H04W 48/06 |
| 2020/0228420 A1* | 7/2020 | Dao | H04L 41/5032 |
| 2020/0351762 A1* | 11/2020 | Casati | H04W 60/04 |
| 2021/0022022 A1* | 1/2021 | Guo | H04W 4/16 |
| 2021/0076192 A1* | 3/2021 | Wu | H04L 67/22 |
| 2021/0092588 A1* | 3/2021 | Xin | H04W 60/00 |

* cited by examiner

FIG. 6

| Service name | Description |
|---|---|
| Nnwdaf_AnalyticsSubscription | This service enables the NF service consumers to subscribe/unsubscribe for different type of analytics from NWDAF. |
| Nnwdaf_AnalyticsInfo | This service enables the NF service consumers to request and get different type of analytics information from NWDAF. |

FIG. 7

| Service producer | Service |
|---|---|
| AMF | Namf_EventExposure |
| SMF | Nsmf_EventExposure |
| PCF | Npcf_EventExposure (for a group of UEs or any UE)<br>Npcf_PolicyAuthorization_Subscribe (for a specific UE) |
| UDM | Nudm_EventExposure |
| NEF | Nnef_EventExposure |
| AF | Naf_EventExposure |
| NRF | Nnrf_NFDiscovery<br>Nnrf_NFManagement |

FIG. 8

| Information | Source | Description |
|---|---|---|
| UE ID | SMF, AF | SUPI in the case of SMF, GPSI or external UE ID in the case of AF |
| Group ID | SMF, AF | To identify UE group if available Internal Group ID in the case of SMF, External Group ID in the case of AF |
| S-NSSAI | SMF | Information to identify a Network Slice |
| DNN | SMF | Data Network Name where PDU connectivity service is provided |
| Application ID | SMF, AF | Identifying the application providing this information |
| Expected UE Behaviour parameters | AF | Same as Expected UE Behaviour parameters |
| UE communication (1..max) | UPF, AF | Communication description per application |
| >Communication start | | The time stamp that this communication starts |
| >Communication stop | | The time stamp that this communication stops |
| >UL data rate | | UL data rate of this communication |
| >DL data rate | | DL data rate of this communication |
| >Traffic volume | | Traffic volume of this communication |
| Type Allocation code (TAC) | AMF | To indicate the terminal model and vendor information of the UE. The UEs with the same TAC may have similar communication behavior. The UE whose communication behavior is unlike other UEs with the same TAC may be an abnormal one. |

FIG. 9

| Information | Description |
|---|---|
| UE group ID or UE ID | Identifies an UE or a group of UEs, e.g. internal group ID or SUPI (see NOTE). |
| UE communications (1..max) | List of communication time slots. |
| > Periodic communication indicator | Identifies whether the UE communicates periodically or not. |
| > Periodic time | Interval Time of periodic communication (average and variance) if periodic. Example: every hour |
| > Start time | Start time observed (average and variance). |
| > Duration time | Duration interval time of communication (average and variance). |
| > Traffic characterization | S-NSSAI, DNN, ports, other useful information. |
| > Traffic volume | Volume UL/DL (average and variance). |
| > Ratio | Percentage of UEs in the group (in the case of an UE group). |

FIG. 10

| Information | Description |
|---|---|
| UE group ID or UE ID | Identifies an UE or a group of UEs, e.g. internal group ID or SUPI |
| UE communications (1..max) | List of communication time slots. |
| > Periodic communication indicator | Identifies whether the UE communicates periodically or not. |
| > Periodic time | Interval Time of periodic communication (average and variance) if periodic. Example: every hour |
| > Start time | Start time predicted (average and variance). |
| > Duration time | Duration interval time of communication. |
| > Traffic characterization | S-NSSAI, DNN, ports, other useful information. |
| > Traffic volume | Volume UL/DL (average and variance). |
| > Confidence | Confidence of the prediction. |
| > Ratio | Percentage of UEs in the group (in the case of an UE group). |

METHOD AND SYSTEM FOR PROVIDING COMMUNICATION ANALYSIS OF USER EQUIPMENT BASED ON NETWORK DATA ANALYSIS

CROSS-REFERENCE TO RELATED APPLICATION(S)

This application claims the benefit of Korean Patent Application No. 10-2019-0053316, filed on May 7, 2019, No. 10-2019-0070207, filed on Jun. 13, 2019, No. 10-2019-0151019, filed on Nov. 22, 2019, and No. 10-2020-0054222 filed on May 7, 2020, in the Korean Intellectual Property Office, the disclosure of which is incorporated herein by reference.

BACKGROUND

1. Field of the Invention

One or more example embodiments relate to a network data collection method from application function device for network data analytic function.

2. Description of the Related Art

User Equipment(UE) use various types of communication services through a network. User Equipment may or may not be satisfied with the communication service by using the communication service. For this, the network needs to predict the pattern of how the User Equipment used the communication service when the user terminal uses the communication service.

SUMMARY

According to an aspect, there is provided a method for providing UE(User Equipment) communication analysis, comprising: receiving, by a NWDAF device, Nnwdaf_AnalyticsSubscription_Subscribe service operation from a NF device; invoking, by the NWDAF device, Nsmf_EventExposure_Subscribe service operation to a SMF device; receiving, by the NWDAF device, Nsmf_EventExposure_Notify service operation from the SMF device; invoking, by the NWDAF device, Namf_EventExposure_Subscribe service operation to an AMF device; receiving, by the NWDAF device, Namf_EventExposure_Notify service operation from the AMF device; deriving, by the NWDAF device, UE communication analysis in a form as UE communication statistics or UE communication prediction; providing the UE communication analytics to the NF device using Nnwdaf_AnalyticsInfo_Request response service operation or Nnwdaf_AnalyticsSubscription_Notify service operation, wherein the Nnwdaf_AnalyticsSubscription_Subscribe service operation includes (i) Analytics ID set to UE communication analytics (ii) Analytic Filter set to Application ID and area of interest.

The Naf_EventExposure_Subscribe service operation includes Event ID, external UE ID, Application ID and Area of Interest.

The NWDAF device subscribes communication information for application identified by Application ID from the AF device for UE.

The NWDAF device invokes smf_EventExposure_Subscribe including Event ID, SUPI, Application ID and Area of Interest to the SMF device.

The NWDAF device invokes Namf_EventExposure_Request including Event ID and SUPI.

The NWDAF device retrieves a Type Allocation code from the AMF device.

The UE communication statistics includes at least one of UE group ID or UE ID, UE communications, Periodic communication indicator, Periodic time, Start time, Duration time, Traffic characterization, Traffic volume and Ratio.

The UE communication prediction includes at least one of UE group ID or UE ID, UE communications, Periodic communication indicator, Periodic time, Start time, Duration time, Traffic characterization, Traffic volume, Confidence and Ratio.

The AF device is external AF, wherein a NEF device translates a requested Area of Interest into a list of geographic zone identifier.

According to an aspect, there is provided a system for providing UE(User Equipment) communication analysis, comprising: one or more processor in a NWDAF device configured to: receive Nnwdaf_AnalyticsSubscription_Subscribe service operation from a NF device; invoke Nsmf_EventExposure_Subscribe service operation to a SMF device; receive Nsmf_EventExposure_Notify service operation from the SMF device; invoke Namf_EventExposure_Subscribe service operation to an AMF device; receive Namf_EventExposure_Notify service operation from the AMF device; derive UE communication analysis in a form as UE communication statistics or UE communication prediction; provide the UE communication analytics to the NF device using Nnwdaf_AnalyticsInfo_Request response service operation or Nnwdaf_AnalyticsSubscription_Notify service operation, wherein the Nnwdaf_AnalyticsSubscription_Subscribe service operation includes (i) Analytics ID set to UE communication analytics (ii) Analytic Filter set to Application ID and area of interest.

The Naf_EventExposure_Subscribe service operation includes Event ID, external UE ID, Application ID and Area of Interest.

The NWDAF device subscribes communication information for application identified by Application ID from the AF device for UE.

The NWDAF device invokes smf_EventExposure_Subscribe including Event ID, SUPI, Application ID and Area of Interest to the SMF device.

The NWDAF device invokes Namf_EventExposure_Request including Event ID and SUPI.

The NWDAF device retrieves a Type Allocation code from the AMF device.

The UE communication statistics includes at least one of UE group ID or UE ID, UE communications, Periodic communication indicator, Periodic time, Start time, Duration time, Traffic characterization, Traffic volume and Ratio.

The UE communication prediction includes at least one of UE group ID or UE ID, UE communications, Periodic communication indicator, Periodic time, Start time, Duration time, Traffic characterization, Traffic volume, Confidence and Ratio.

The AF device is external AF, wherein a NEF device translates a requested Area of Interest into a list of geographic zone identifier.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 6 is a diagram illustrating network service functions provided by the NWDAF device according to an example embodiment;

FIG. 7 is a diagram illustrating network service functions consumed by the NWDAF device for a data collection according to an example embodiment;

FIG. 8 is a diagram illustrating service data related to UE communication according to an example embodiment;

FIG. 9 is a diagram illustrating UE communication statistics according to an example embodiment; and FIG. 10 is a diagram illustrating UE communication prediction according to an example embodiment.

DETAILED DESCRIPTION

Figure 1:
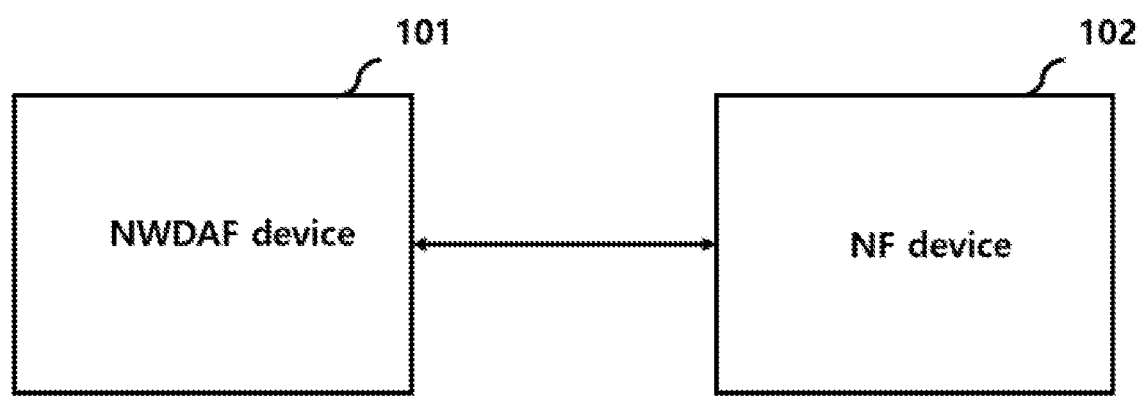
FIG. 1 is a diagram illustrating a relationship between NWDAF device and NF device according to an example embodiment.

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

The terminology used herein is for the purpose of describing particular embodiments only and is not intended to be limiting. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

Hereinafter, the example embodiments will be described in detail with reference to the accompanying drawings. The full name of a word used in the present invention is as follows. And, the term AMF, AF, NEF, NRF, PCF, UDM, NWDAF, CHF, NF, and SMF may be represented as device.

5GC: 5G Core Network
AF: Application Function
AMF: Access and Mobility Management Function
AUSF: Authentication Server Function
CHF: Charging Function
FQDN: Fully Qualified Domain Name
GPSI: Generic Public Subscription Identifier
NEF: Network Exposure Function
NF: Network Function
NRF: Network Repository Function
NWDAF: Network Data Analytics Function
PCF: Policy Control Function
PDU: Protocol Data Unit
SMF: Session Management Function
S-NSSAI: Single Network Slice Selection Assistance Information
SUPI: Subscription Permanent Identifier
UDM: Unified Data Management
DR: Unified Data Repository FIG. 1 is a diagram illustrating a relationship between NWDAF device and NF device according to an example embodiment.

<Network Data Analytics Function (NWDAF)>

NWDAF represents operator managed network analytics logical function. The NWDAF includes the following functionality:

Support data collection from NFs and AFs;
Support data collection from OAM;
NWDAF service registration and metadata exposure to NFs/AFs;
Support analytics information provisioning to NFs, AF.

<Reference Architecture for Data Analytics>

The NWDAF (Network Data Analytics Function) is part of the architecture and uses the mechanisms and interfaces specified for 5GC and OAM services.

The NWDAF interacts with different entities for different purposes:

Data collection based on subscription to events provided by AMF, SMF, PCF, UDM, AF (directly or via NEF), and OAM;
Retrieval of information from data repositories (e.g. UDR via UDM for subscriber-related information);
Retrieval of information about NFs (e.g. from NRF for NF-related information);
On demand provision of analytics to consumers.

A single instance or multiple instances of NWDAF may be deployed in a PLMN. If multiple NWDAF instances are deployed, the architecture supports deploying the NWDAF as a central NF, as a collection of distributed NFs, or as a combination of both.

When multiple NWDAFs exist, not all of them need to be able to provide the same type of analytics results. For example, some of multiple NWDAFs may be specialized in providing certain types of analytics. An Analytics ID information element is used to identify the type of supported analytics that NWDAF may generate.

NWDAF instance(s) may be collocated with a 5GC(5G core network) NF.

<Non-Roaming Architecture>

The 5G System architecture allows NWDAF to collect data from any 5GC NF. The NWDAF belongs to the same PLMN as the 5GC NF that provides the data.

The Nnf interface is defined for the NWDAF to request subscription to data delivery for a particular context, to cancel subscription to data delivery and to request a specific report of data for a particular context.

The 5G System architecture allows NWDAF to retrieve the management data from OAM by invoking OAM services.

The 5G System architecture allows any 5GC NF to request network analytics information from NWDAF. The NWDAF belongs to the same PLMN as the 5GC NF that consumes the analytics information.

<Network Data Analytics Functional Description>

The NWDAF provides analytics to 5GC NFs, and OAM.

Analytics information are either statistical information of the past events, or predictive information.

Different NWDAF instances may be present in the 5GC, with possible specializations per type of analytics. The capabilities of a NWDAF instance are described in the NWDAF profile stored in the NRF.

In order to support NFs that are consumers of analytics with the discovery of a NWDAF instance that is able to provide some specific type of analytics, each NWDAF instance should provide the list of Analytics ID(s) that it supports when registering to the NRF, in addition to other NRF registration elements of the NF profile. Other NFs requiring the discovery of an NWDAF instance that provides support for some specific type of analytics may query the NRF and include the Analytics ID(s) that identifies the desired type of analytics for that purpose.

The consumers including 5GC NFs and OAM decide how to use the data analytics provided by NWDAF. The interactions between 5GC NF(s) and the NWDAF take place within a PLMN. The NWDAF has no knowledge about NF application logic. The NWDAF may use subscription data but only for statistical purpose.

<NWDAF Discovery and Selection>

The NWDAF service consumer selects an NWDAF that supports requested analytics information by using the NWDAF discovery principles.

<NWDAF Discovery and Selection>

Multiple instances of NWDAF may be deployed in a network.

The NF consumers may utilize the NRF to discover NWDAF instance(s) unless NWDAF information is available by other means, e.g. locally configured on NF consumers. The NWDAF selection function in NF consumers selects an NWDAF instance based on the available NWDAF instances.

The following factors may be considered by the NF consumer for NWDAF selection:
S-NSSAI.
Analytics ID(s).
NWDAF Serving Area information, i.e. list of TAIs for which the NWDAF can provide analytics.

<Procedures to Support Network Data Analytics>

Figure 2:
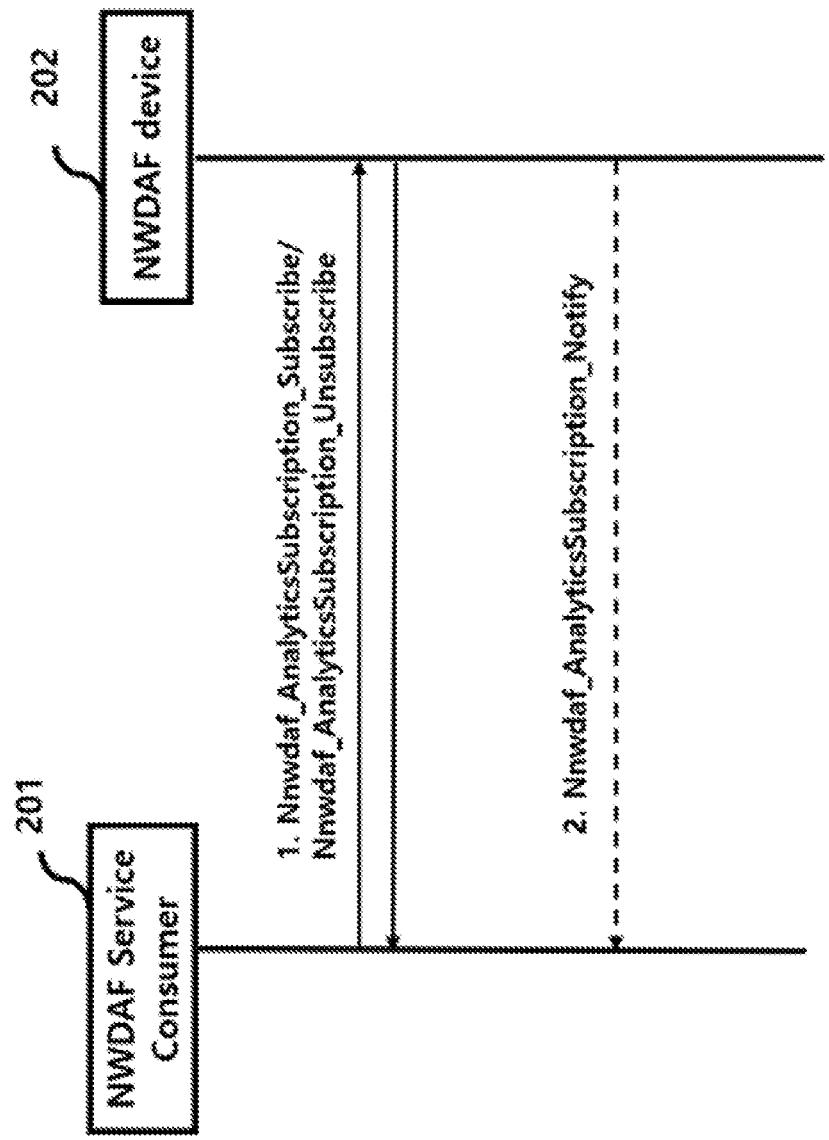
FIG. 2 is a diagram illustrating subscription/unsubscription of network data analytic according to an example embodiment.

FIG. 2 is a diagram illustrating subscription/unsubscription of network data analytic according to an example embodiment.

<Analytics Subscribe/Unsubscribe by NWDAF Service Consumer>

This procedure of FIG. 2 is used by any NWDAF service consumer (e.g. including NFs/OAM) to subscribe/unsubscribe at NWDAF to be notified on analytics information, using Nnwdaf_AnalyticsSubscription service.

This service is also used by an NWDAF service consumer to modify existing analytics subscription(s). Any entity can consume this service.

1. The NWDAF service consumer subscribes to or cancels subscription to analytics information by invoking the Nnwdaf_AnalyticsSubscription_Subscribe/Nnwdaf_AnalyticsSubscription_Unsubscribe service operation. The parameters that can be provided by the NWDAF service consumer are listed.

When a subscription to analytics information is received, the NWDAF determines whether triggering new data collection is needed.

If the service invocation is for a subscription modification, the NF service consumer includes an identifier (Subscription Correlation ID) to be modified in the invocation of Nnwdaf_AnalyticsSubscription_Subscribe.

2. If NWDAF service consumer subscribes to analytics information, the NWDAF notifies the NWDAF service consumer with the analytics information by invoking Nnwdaf_AnalyticsSubscription_Notify service operation, based on the request from the NWDAF service consumer, e.g. Analytics Reporting Parameters.

Figure 3:
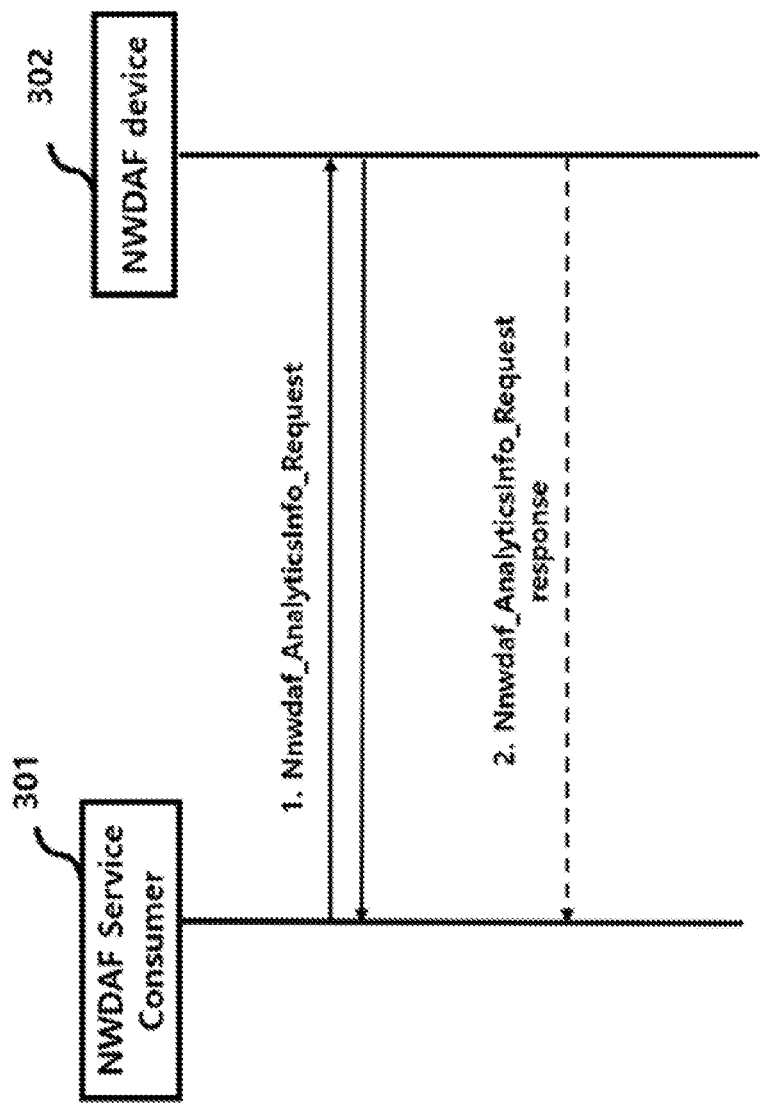
FIG. 3 is a diagram illustrating a request of network data analytic according to an example embodiment.

FIG. 3 is a diagram illustrating a request of network data analytic according to an example embodiment.

<Analytics Request by NWDAF Service Consumer>

This procedure of FIG. 3 is used by the NWDAF service consumer (e.g. including NFs/OAM) to request and get from NWDAF analytics information, using Nnwdaf_AnalyticsInfo service.

1. The NWDAF service consumer requests analytics information by invoking Nnwdaf_AnalyticsInfo_Request service operation. The parameters that can be provided by the NWDAF service consumer are listed.

When a request for analytics information is received, the NWDAF determines whether triggering new data collection is needed.

2. The NWDAF responds with analytics information to the NWDAF service consumer.

The input parameters are described in FIG. 2 and FIG. 3 including the service operation in following:

<Contents of Analytics Exposure>

The consumers of the Nnwdaf_AnalyticsSubscription or Nnwdaf_AnalyticsInfo service operations provide the following input parameters listed below.

A list of Analytics ID(s): identifies the requested analytics.

Analytics Filter Information: indicates the conditions to be fulfilled for reporting Analytics Information. This set of optional parameter types and values enables to select which type of analytics information is requested. Analytics Filter Information are defined.

Target of Analytics Reporting: indicates the object(s) for which Analytics information is requested, entities such as specific UEs, a group of UE(s) or any UE (i.e. all UEs).

(for Nnwdaf_AnalyticsSubscription) A Notification Target Address (+Notification Correlation ID), allowing to correlate notifications received from NWDAF with this subscription.

Analytics Reporting Information with the following parameters:

(for Nnwdaf_AnalyticsSubscription) Analytics Reporting Parameters as per Event Reporting parameters.

(for Nnwdaf_AnalyticsSubscription) Reporting Thresholds, which indicate conditions on the level of each requested analytics that when reached may be notified by the NWDAF. A matching direction may be provided such as below, above, or crossed. If no matching direction is provided, the default direction is crossed.

Analytics target period: time interval [start ... end], either in the past (both start time and end time in the past) or in the future (both start time and end time in the future). An Analytics target period in the past is a request or subscription for statistics. An Analytics target period in the future is a request or subscription for predictions. The time interval is expressed with actual start time and actual end time (e.g. via UTC time). When the Analytics Reporting Parameters indicate a periodic reporting mode, the time interval can also be expressed as positive or negative offsets to the reporting time. By setting start time and end time to the same value, the consumer of the analytics can request analytics or subscribe to analytics for a specific time rather than for a time interval.

Preferred level of accuracy of the analytics (e.g. Low/ High).

(for Nnwdaf_AnalyticsInfo_Request) Time when analytics information is needed (if applicable). If the time is reached the consumer does not need to wait for the analytics information any longer, yet the NWDAF may send an error response to the consumer.

Maximum number of objects requested by the consumer (max) to limit the number of objects in a list of analytics per Nnwdaf_AnalyticsSubscription_Notify or Nnwdaf_AnalyticsInfo_Request response.

Maximum number of SUPIs (SUPImax) requested by the consumer to limit the number of SUPIs in an object. When SUPImax is not provided, the NWDAF shall return all SUPIs concerned by the analytics object. When SUPImax is set to 0, the NWDAF may not provide any SUPI.

The feasibility of the parameter "Time when analytics are needed" will be checked by stage 3.

The NWDAF provides to the consumer of the Nnwdaf_AnalyticsSubscription or Nnwdaf_AnalyticsInfo service operations, the output information listed below:

(for Nnwdaf_Analytics Subscription) The Notification Correlation Information.

For each Analytics ID the analytics information in the requested Analytics target period.

In addition, the following additional information:

Timestamp of analytics generation, which allows consumers to decide until when the received information may be used. For instance, an NF can deem a received notification from NWDAF for a given feedback as invalid based on this timestamp;

Validity period, which defines the time period for which the analytics information is valid.

Probability assertion: level of certainty, confidence in statistics/prediction.

Figure 4:
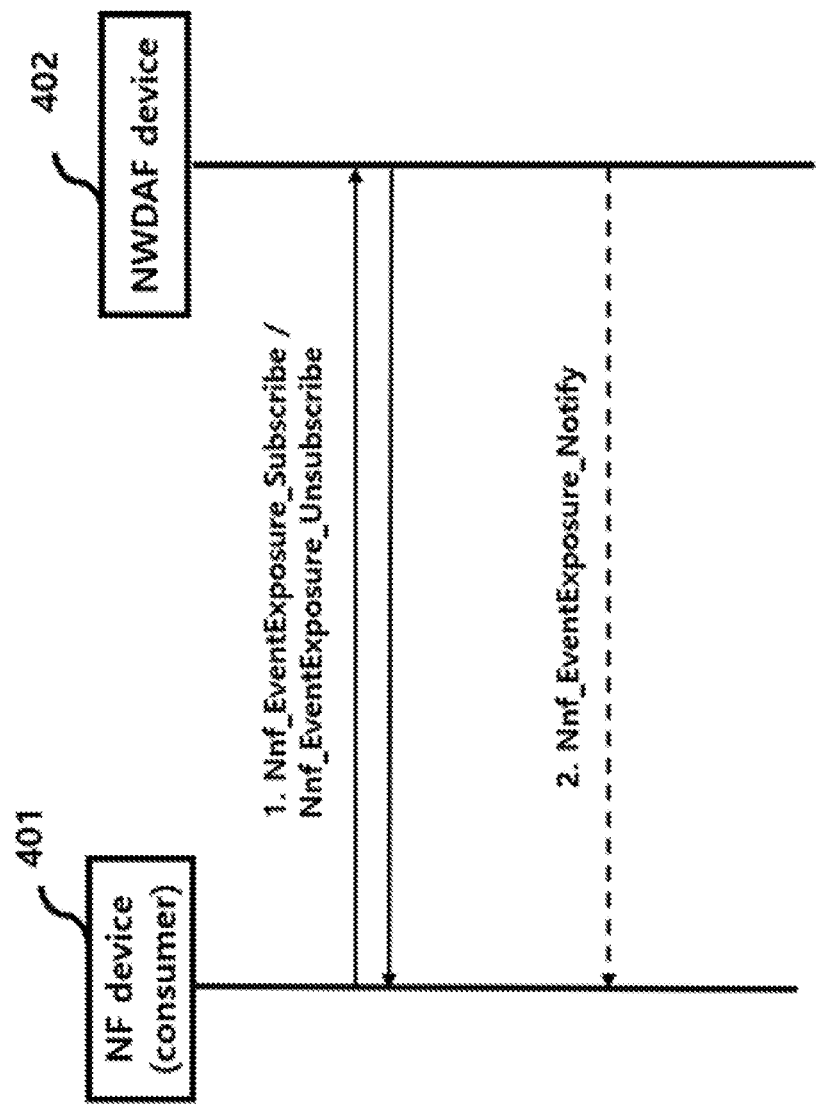
FIG. 4 is a diagram illustrating subscription/unsubscription of event exposure according to an example embodiment.

FIG. 4 is a diagram illustrating subscription/unsubscription of event exposure according to an example embodiment <Procedures for Data Collection>

The Data Collection feature permits NWDAF to retrieve data from various sources (e.g. NF such as AMF, SMF, PCF, and AF; OAM), as a basis of the computation of network analytics.

All available data encompass:

OAM global NF data,

Data available in NFs, e.g. behaviour data related to individual UEs or UE groups (e.g. UE reachability), and pre-computed metrics covering UE populations (e.g. number of UEs present in a geographical area), per spatial and temporal dimensions (e.g. per region for a period of time), NF data available in the 5GC (e.g. NRF), Data available in AF.

The NWDAF may use at least one of the following services:

the Generic management services, the Performance Management services or the Fault Supervision services, offered by OAM in order to collect OAM global NF data.

the Exposure services offered by NFs in order to retrieve data and other non-OAM pre-computed metrics available in the NFs.

Other NF services in order to collect NF data (e.g. NRF)

The NWDAF may obtain the proper information to perform data collection for a UE or group of UEs:

For an Analytics ID, NWDAF is configured with the corresponding NF Type(s) and/or event ID(s) and/or OAM measurement types.

NWDAF may determine which NF instance(s) of the relevant NF type(s) are serving the UE or group of UEs, optionally taking into account the S-NSSAI(s) and area of interest.

NWDAF invokes Nnf_EventSubscribe services to collect data from the determined NF instance(s), and/or triggers the procedure to subscribe to OAM services to collect the OAM measurement.

The NWDAF performs data collection from an AF directly or via NEF.

The NWDAF may be able to discover the events supported by a NF.

Data collection procedures enables the NWDAF to efficiently obtain the appropriate data with the appropriate granularity.

When a request or subscription for statistics or predictions is received, the NWDAF may not possess the necessary data to perform the service, including:

Data on the monitoring period in the past, which is necessary for the provision of statistics and predictions matching the Analytics target period.

Data on longer monitoring periods in the past, which is necessary for model training.

Therefore, in order to optimize the service quality, the NWDAF may undertake the following actions:

The NWDAF may return a probability assertion expressing the confidence in the prediction produced. Prediction may be returned with zero confidence as described below. This confidence is likely to grow in the case of subscriptions.

The value of the confidence depends on the level or urgency expressed by the parameter "preferred level of accuracy of the analytics" as listed, the parameter "time when analytics information is needed", and the availability of data. If no sufficient data is collected to provide an estimation for the requested level of accuracy before the time deadline, the service may return a zero confidence. Otherwise, the NWDAF may wait until enough data is collected before providing a response or a first notification.

In order to be prepared for future requests on statistics from NFs/OAM, the NWDAF, upon operator configuration, may collect data on its own initiative, e.g. on samples of UEs (e.g. mobility), and retain the data collected in the data storage.

The volume and maximum duration of data storage is also subject of operator configuration.

The NWDAF may decide to reduce the amount of data collected to reduce signalling load, by either prioritizing requests received from analytics consumers, or reducing the extent (e.g. duration, scope) of data collection, or modifying the sampling ratios.

The NWDAF may skip data collection phase when the NWDAF already has enough information to provide requested analytics.

The data which NWDAF may collect is listed for each analytics in input data and is decided by the NWDAF.

NOTE: NWDAF can skip data collection phase for some specific input data per the requested analytics e.g. when some of the data is already available at NWDAF for the requested analytics, or when NWDAF considers that some of the data is not needed at all to provide the requested analytics as per the analytics consumer request (e.g. based on preferred level of accuracy or based on the time when analytics are needed).

<Procedure for Data Collection from NFs>

The procedure in FIG. 4 is used by NWDAF to subscribe/unsubscribe at NFs in order to be notified for data collection on a related event (s), using Event Exposure Services as listed.

1. The NWDAF subscribes to or cancels subscription for a (set of) Event ID(s) by invoking the Nnf_Event-Exposure_Subscribe/Nnf_EventExposure_Unsubscribe service operation.

2. If NWDAF subscribes to a (set of) Event ID(s), the NFs notify the NWDAF (e.g. with the event report) by invoking Nnf_EventExposure_Notify service operation.

The NWDAF can use the immediate reporting flag to meet the request-response model for data collection from NFs.

<Usage of Exposure Framework by the NWDAF for Data Collection>

The NWDAF may subscribe (and unsubscribe) to the Event exposure service from NF(s) reusing the framework. This framework supports the possibility for the NWDAF to indicate/request:

Events-ID: one or multiple Event ID(s)

Target of Event Reporting: the objects targeted by the Events. Within a subscription, all Event ID(s) are associated with the same target of event reporting. In the case of NWDAF, the objects can be UE(s), UE group(s), any UE.

Event Filter Information. This provides Event Parameter Types and Event Parameter Value(s) to be matched against.

A Notification Target Address and a Notification Correlation ID, allowing the NWDAF to correlate notifications received from the NF with this subscription.

Event Reporting Information.

Expiry time.

The notifications from NFs/AFs contain on top of the Event being reported (and of dedicated information being reported for this event):

the Notification Correlation Information provided by the NWDAF in its request, (when applicable to the event) the Target Id e.g. UE ID (SUPI and if available GPSI), and a time stamp.

Figure 5:
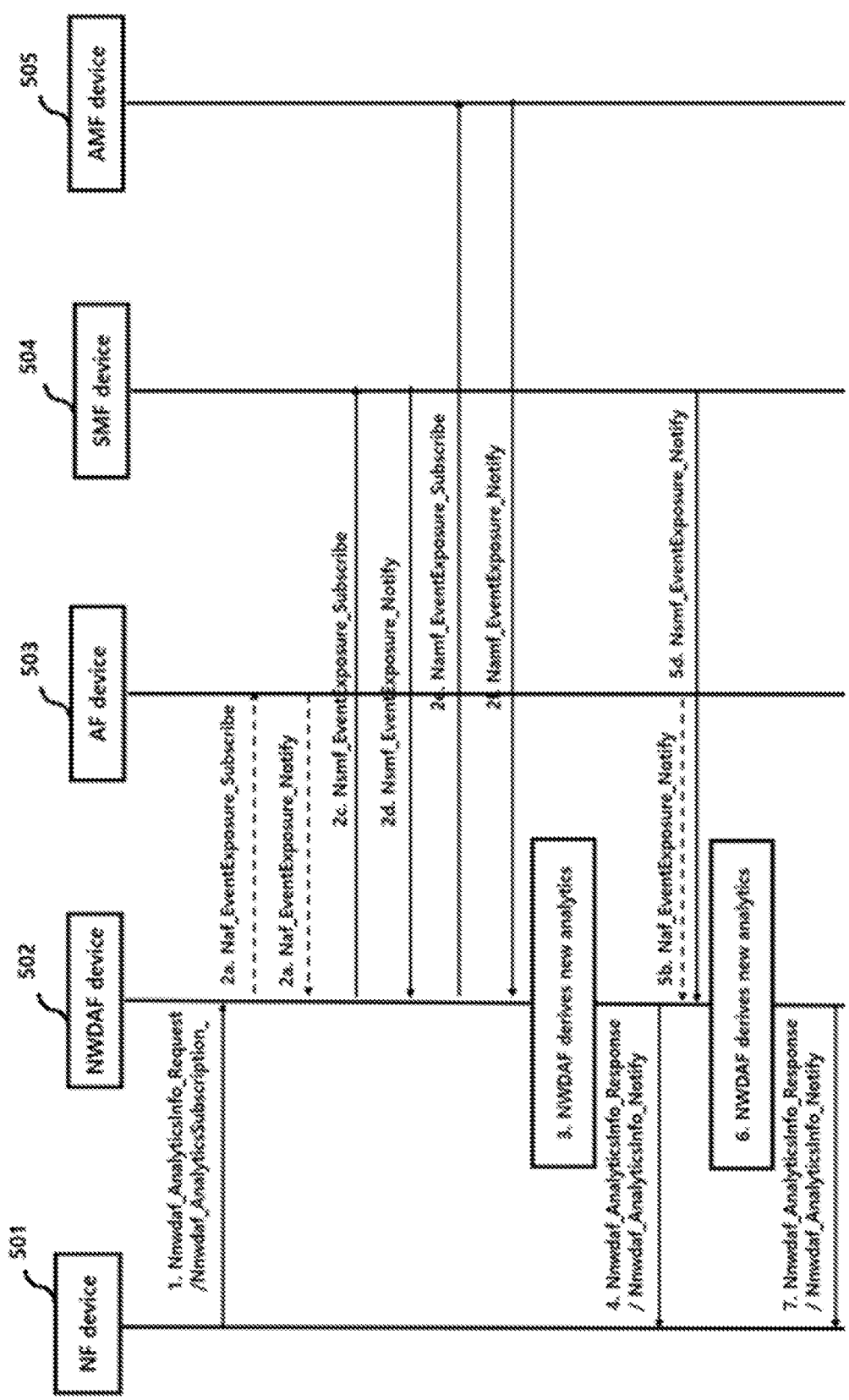
FIG. 5 is a diagram illustrating a procedure for providing UE communication analysis according to an example embodiment.

FIG. 5 is a diagram illustrating a procedure for providing UE communication analysis according to an example embodiment;

The NWDAF can provide UE communication related analytics, in the form of statistics or predictions or both, to a 5G CoreNetwork NF.

1. 5GC NF to NWDAF: Nnwdaf_Analytics-Subscription_Subscribe (Analytics ID=UE communication analytics, Target of Analytics Reporting=SUPI(s), Analytics Filter=(Application ID, Area of Interest, etc.)).

5GC NF sends a request to the NWDAF for analytics on a specific UE(s), using either Nnwdaf_AnalyticsInfo or Nnwdaf_AnalyticsSubscription_Subscribe service. The analytics type indicated by "Analytics ID" is set to "UE communication". The Target of Analytics Reporting is set to SUPI or a list of SUPI and Analytics Filter may include Application ID and Area of Interest.

2a-b. NWDAF to AF (Optional): Naf_Event-Exposure_Subscribe (Event ID, external UE ID, Application ID, Area of Interest).

In order to provide the requested analytics, the NWDAF may subscribe per application communication information, which is identified by Application ID, from AFs for the UE. The Event ID indicates communication report for the UE which is requested by the 5GC NF in the step 1. The external UE ID is obtained by the NWDAF based on UE internal ID, i.e., SUPI. In the case of external AF, the NEF translates the requested Area of Interest into a list of geographic zone identifier(s).

This step is skipped if the NWDAF already has the requested analytics available or has subscribed to the AF.

2c-d. NWDAF to SMF: Nsmf_EventExposure_Subscribe (Event ID, SUPI, Application ID, Area of Interest).

In order to provide the requested analytics, the NWDAF subscribes to information of the UE from SMFs.

2e-f. NWDAF to AMF: Namf_EventExposure_Request (Event ID, SUPI).

In order to provide the requested analytics, the NWDAF retrieves Type Allocation code from AMF.

The NWDAF determines the SMF serving the UE.

3. The NWDAF derives requested analytics, in the form of UE communication statistics or predictions or both.

4. NWDAF to 5GC NF: Nnwdaf_AnalyticsInfo_Request response or Nnwdaf_AnalyticsSubscription_Notify.

The NWDAF provides requested UE communication analytics to the NF, using either Nnwdaf_AnalyticsInfo_Request response or Nnwdaf_AnalyticsSubscription_Notify, depending on the service used in step 1.

5-7. If the NF subscribed UE communication analytics at step 1, when the NWDAF generates new analytics, it provides the new generated analytics to the NF.

FIG. 6 is a diagram illustrating network service functions provided by the NWDAF device according to an example embodiment.

(1) Nnwdaf_Analytics Subscription

Nnwdaf_AnalyticsSubscription service operation enables the NF service consumers to subscribe/unsubscribe for different type of analytics from NWDAF (2) Nnwdaf_AnalyticsInfo Nnwdaf_AnalyticsInfo service operation enables the NF service consumers to request and get different type of analytics information from NWDAF.

FIG. 7 is a diagram illustrating network service functions consumed by the NWDAF device for a data collection according to an example embodiment.

<Network Exposure>

The network capability exposure comprises

Exposure of network events externally as well as internally towards core network NFs;

Exposure of provisioning capability towards external functions;

Exposure of policy and charging capabilities towards external functions;

Exposure of core network internal capabilities for analytics.

Exposure of analytics to external party.

Retrieval of data from external party by NWDAF.

When subscribing to event reporting the NF consumer(s) provide:

One or multiple Event ID(s). An Event ID identifies the type of event being subscribed to (e.g. PDU Session Release, UE mobility out of an Area of Interest, etc.).

Event Filter Information: Provides Event Parameter Types and Event Parameter Value(s) to be matched against, in order to meet the condition for notifying the subscribed Event ID e.g. the Event Parameter Type could be "Area of interest" and Event Parameter Value list could be list of TAs; The Event Filter depends on the Event ID. The Event Filter Information is provided per Event ID(s) being subscribed to: within a subscription different Event ID(s) may be associated with different Event Filter Information.

Event Reporting Information. Within a subscription all Event ID(s) are associated with a unique Event Reporting Information.

Target of Event Reporting: this may indicate a specific UE or PDU Session, a group of UE(s) or any UE (i.e. all UEs), Within a subscription all Event ID (s) are associated with the same Target of Event Reporting (possibly corresponding to multiple UE or multiple PDU Sessions).

A Notification Target Address (+Notification Correlation ID) allowing the Event Receiving NF to correlate notifications received from the Event provider with this subscription. A subscription is associated with an unique Notification Target Address (+Notification Correlation ID). In the case that the NF consumer subscribes to the NF producer on behalf of other NF, the NF consumer includes the Notification Target Address (+Notification Correlation ID) of other NF for the Event ID which is to be notified to other NF directly, and the Notification Target Address(+Notification Correlation ID) of itself for the Subscription change related event notification.

Each Notification Target Address(+Notification Correlation ID) is associated with related (set of) Event ID(s).

An Expiry time represents the time up to which the subscription is desired to be kept as active. The NF service consumer may suggest an Expiry time and provide to the NF service producer. Based on the operator's policy, the NF service producer decides whether the subscription can be expired. If the subscription can be expired, the NF service producer determines the Expiry time and provide it in the response to the NF service consumer. If the event subscription is about to expire based on the received Expiry time and the NF service consumer wants to keep receiving notifications, the NF service consumer update the subscription with the NF service producer in order to extend the Expiry time. Once the Expiry time associated with the subscription is reached, the subscription becomes invalid at the NF service producer. If the NF service consumer wants to keep receiving notifications, it may create a new subscription with the NF service producer.

When the subscription is accepted by the Event provider NF, the consumer NF receives from the event provider NF an identifier (Subscription Correlation ID) allowing to further manage (modify, delete) this subscription.

The Notification Correlation ID is allocated by the consumer NF that subscribes to event reporting and the Subscription Correlation ID is allocated by the NF that notifies when the event is met. Both correlation identifiers can be assigned the same value, although in principle they are supposed to be different, as they are optimized for finding the subscription related context within each NF.

The consumer NF may use an operation dedicated to subscription modification to add or remove Event ID(s) to this subscription or to modify Event Filter Information.

Events are subscribed by the consumer NF(s) by providing Event Filters. The contents of the Event Reporting Information along with the presence requirement of each information element is described.

TABLE 1

| Event Reporting Information Parameter | Description |
| --- | --- |
| Event reporting mode | Mode of reporting - e.g reporting up to a maximum number of reports, periodic reporting along with periodicity, reporting up to a maximum duration |
| Maximum number of reports | Maximum number of reports after which the event subscription ceases to exist |
| Maximum duration of reporting | Maximum duration after which the event subscription ceases to exist |
| Immediate reporting flag | The Event provider NF notifies the current status of the subscribed event, if available, immediately to the service consumer NF. |
| Sampling ratio | Percentage of sampling (1% . . . 100%) among impacted UEs. |
| Group Reporting Guard Time | Parameter for group-based monitoring configuration to indicate the time for which the Monitoring Event Reporting(s) detected by the UEs in a group can be aggregated before sending them to the service consumer NF. |

<Data Collection from NFs>

The Data Collection from NFs is used by NWDAF to subscribe/unsubscribe at any 5GC NF to be notified for data on a set of events.

The Data Collection from NFs is based on the services of AMF, SMF, UDM, PCF, NRF and AF (possibly via NEF):

Event Exposure Service offered by each NF.

other NF services (e.g. Nnrf_NFDiscovery and Nnrf_NF-Management in NRF)

This data collection service is used directly in order to retrieve behaviour data for individual UEs or groups of UEs (e.g. UE reachability), and also to retrieve global UE information (e.g. Number of UEs present in a geographical area).

The present document specifies that NWDAF can collect some UPF input data for deriving analytics, but how NWDAF collects these UPF input data is not defined.

When NWDAF receives a request addressed to an Internal Group ID from a consumer, NWDAF may need to initiate data collection from several 5GC NFs, such as AMF, SMF, UDM, PCF, NEF/AF, etc. NWDAF may first discover the instances of the required 5GC NFs deployed in the network, e.g. by querying NRF.

For discovering the UDM, NWDAF can query the NRF with the Internal Group ID as the target of the query. For discovering AMF, SMF, PCF, NEF, and AF, NWDAF may need to discover all the instances in the network by using the Nnrf_NFDiscovery service.

It is assumed that all members of an Internal Group ID belong to the same UDM Group ID. NWDAF can select a UDM instance supporting the UDM Group ID of the Internal Group ID.

Then, if data needs to be collected from AMF, SMF, UDM, and PCF, NWDAF may initiate the data collection with the Internal Group ID as the target, e.g. subscribing to the event exposure in all the instances of a given type of network function. This subscription to all the instances of required source of event exposure handles, e.g. mobility of UEs across AMFs, or initiation of new PDU sessions with different allocated SMFs.

For collecting data from AMF and SMF, NWDAF may collect the data directly from AMF and/or SMF, or indirectly via UDM.

The NEF instance that is serving a specific network slices and/or applications of a UE should be determined using NRF using optional request parameters.

If NWDAF needs to collect data from an AF deployed outside the operator's domain, the NWDAF may contact NEF with a SUPI or Internal Group ID as the target of the data collection. NEF is responsible for translation of SUPI to GPSI, or internal to external group identifiers, by querying UDM, prior to contacting the AF.

<NEF>

Exposure of analytics:

NWDAF analytics may be securely exposed by NEF for external party.

Retrieval of data from external party by NWDAF:

Data provided by the external party may be collected by NWDAF via NEF for analytics generation purpose.

NEF handles and forwards requests and notifications between NWDAF and AF.

<NRF>

The Network Repository Function (NRF) supports the following functionality:

Supported Analytics ID(s), NWDAF Serving Area information (i.e. list of TAIs for which the NWDAF can provide analytics) if available in the case of NWDAF.

NOTE 4: The NWDAF's Serving Area information is common to all its supported Analytics IDs.

Event ID(s) supported by AFs, in the case of NEF.

Application ID(s) supported by AFs, in the case of NEF.

This is applicable when NEF exposes AF information for analytics purpose.

<Data Collection from an AF>

An NF that needs to collect data from an AF may subscribe/unsubscribe to notifications regarding data collected from an AF, either directly from the AF or via NEF.

The data collected from an AF is used as input for analytics by the NWDAF.

The details for the data collected from an AF as well as interactions between NEF, AF and NWDAF are described.

<Observed Service Experience Related Network Data Analytics>

NWDAF subscribes the network data from 5GC NF(s) and the service data from AF, or via NEF to train a Service MOS Model for the given application in the given Area of Interest and then provides the observed service experience for the application in the given Area of Interest.

This description specifies how NWDAF can provide Observed Service Experience (i.e. average observed Service MoS) analytics, in the form of statistics or predictions, to a service consumer.

The Observed Service Experience analytics may provide one or both of the following:

Service Experience for a Network Slice: Service Experience for UEs (for a UE or a group of or any UE) for a given Application or a set of Applications or any Application (i.e. all Applications) in a Network Slice;

Service Experience for an Application: Service Experience (i.e. for a UE or a group of UEs or any UE) in an Application.

Therefore, Observed Service experience may be provided individually per UE or group of UEs, or globally, averaged per Application or averaged across a set of Applications on a Network Slice.

The service consumer may be an NF (e.g. PCF), or the OAM.

The consumer of these analytics may indicate in the request or subscription:

Analytics Id set to "Service Experience";

The Target of Analytics Reporting: one or more SUPI(s) or Internal Group Identifier(s), or "any UE";

Analytics Filter Information and maximum number of objects and maximum number of SUPIs;

An Analytics target period that indicates the time window for which the statistics or predictions are requested;

In a subscription, the Notification Correlation Id and the Notification Target Address.

If Area of Interest is applied in Analytics Filter Information by the service consumer, the Area of Interest may be a subset of the NWDAF Serving Area information.

The NWDAF may notify the result of the analytics to the consumer.

NWDAF collects the network data from AF (directly or via NEF) and from other 5GC NF(s) in order to calculate and provides statistics and predictions on the observed service experience to a consumer NF or to OAM.

FIG. 8 is a diagram illustrating service data related to UE communication according to an example embodiment.

<Service Data from 5GC Related to UE Communication>

<Input Data>

The NWDAF supporting data analytics on UE communication shall be able to collect communication information for the UE from 5GC. The detailed information collected by the NWDAF includes service data related to UE communication.

How NWDAF collects UE communication related data from UPF is not defined in this Release of the specification.

Depending on the requested level of accuracy, data collection may be provided on samples (e.g. spatial subsets of UEs or UE group, temporal subsets of UE communication information). The application Id is optional. If the application Id is omitted, the collected UE communication information can be applicable to all the applications for the UE.

UE ID: SUPI in the case of SMF, GPSI or external UE ID in the case of AF

Group ID: To identify UE group if available Internal Group ID in the case of SMF, External Group ID in the case of AF S-NSSAI: Information to identify a Network Slice DNN: Data Network Name where PDU connectivity service is provided Application ID: Identifying the application providing this information Expected UE Behaviour parameters: Same as Expected UE Behaviour parameters specified in other spec.

UE communication (1 . . . max): Communication description per application

Communication start: The time stamp that this communication starts

Communication stop: The time stamp that this communication stops

UL data rate: UL data rate of this communication

DL data rate: DL data rate of this communication

Traffic volume: Traffic volume of this communication

Type Allocation code (TAC): To indicate the terminal model and vendor information of the UE. The UEs with the same TAC may have similar communication behavior. The UE whose communication behavior is unlike other UEs with the same TAC may be an abnormal one.

<Output Analytics>

The NWDAF supporting UE Communication Analytics provides the analytics results to consumer NFs. The analytics results provided by the NWDAF include the UE communication statistics.

When target of analytics reporting is an individual UE, one UE ID (i.e. SUPI) will be included, the NWDAF will provide the analytics communication result (i.e. list of (predicted) communication time slots) to NF service consumer(s) for the UE.

The results for UE groups address the group globally. The ratio is the proportion of UEs in the group for a given communication at a given time and duration.

The number of UE communication entries (1 . . . max) is limited by the maximum number of objects provided as input parameter. The communications shall be provided by order of time, possibly overlapping.

Depending on the list size limitation, the least probable communications on a given Analytics target period may not be provided.

FIG. 9 is a diagram illustrating UE communication statistics according to an example embodiment.

<UE Communication Statistics>

UE group ID or UE ID: Identifies an UE or a group of UEs, e.g. internal group ID UE communications (1 . . . max): List of communication time slots.

Periodic communication indicator: Identifies whether the UE communicates periodically or not.

Periodic time: Interval Time of periodic communication (average and variance) if periodic.

Example: every hour.

Start time: Start time predicted (average and variance).

Duration time: Duration interval time of communication.

Traffic characterization: S-NSSAI, DNN, ports, other useful information.

Traffic volume: Volume UL/DL (average and variance).

Ratio: Percentage of UEs in the group (in the case of an UE group).

FIG. 10 is a diagram illustrating UE communication prediction according to an example embodiment.

<UE Communication Predictions>

UE group ID or UE ID: Identifies an UE or a group of UEs, e.g. internal group ID UE communications (1 . . . max): List of communication time slots.

Periodic communication indicator: Identifies whether the UE communicates periodically or not.

Periodic time: Interval Time of periodic communication (average and variance) if periodic.

Example: every hour.

Start time: Start time predicted (average and variance).

Duration time: Duration interval time of communication.

Traffic characterization: S-NSSAI, DNN, ports, other useful information.

Traffic volume: Volume UL/DL (average and variance).

Confidence: Confidence of the prediction.

Ratio: Percentage of UEs in the group (in the case of an UE group).

When target of analytics reporting is an individual UE, one UE ID (i.e. SUPI) will be included, the NWDAF will provide the analytics communication result (i.e. list of (predicted) communication time slots) to NF service consumer(s) for the UE.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The apparatus described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for providing UE(User Equipment) communication analysis, comprising:
   receiving, by an NWDAF (Network Data Analytic Function) device, an Nnwdaf_AnalyticsSubscription_Subscribe service operation from an NF (Network Function) device;
   invoking, by the NWDAF device, an Nsmf_EventExposure_Subscribe service operation to an SMF (Session Management Function) device;
   receiving, by the NWDAF device, an Nsmf_EventExposure_Notify service operation from the SMF device;
   invoking, by the NWDAF device, an Namf_EventExposure_Subscribe service operation to an AMF (Access Management Function) device;
   receiving, by the NWDAF device, an Namf_EventExposure_Notify service operation from the AMF device;
   deriving, by the NWDAF device, UE communication analytics in a form as UE communication statistics or a UE communication prediction; and
   providing the UE communication analytics to the NF device using an Nnwdaf_AnalyticsInfo_Request response service operation or an Nnwdaf_AnalyticsSubscription_Notify service operation,
   wherein the UE communication statistics include a UE group ID or UE ID, UE communications, a Periodic communication indicator, a Periodic time, a Start time, a Duration time, a Traffic characterization, a Traffic volume and a Ratio,
   wherein the UE communication prediction includes the UE group ID or UE ID, the UE communications, the Periodic communication indicator, the Periodic time, the Start time, the Duration time, the Traffic characterization, the Traffic volume, a Confidence and the Ratio,
   wherein the UE group ID or UE ID is information for identifying the UE or a group of a plurality of UEs,
   wherein the UE communications is a list of communication time slots,
   wherein the Periodic communication indicator is information for identifying whether the UE communicates periodically or not,
   wherein the Periodic time is an interval time of periodic communication,
   wherein the Start time is an observed start time and the Duration time is a duration interval time of communication,
   wherein the Traffic characterization includes S-NSSAL, DNN or ports,
   wherein the Traffic volume is a volume of downlink or uplink,
   wherein the Ratio is a percentage of UEs in the group in a case of the group of the plurality of UEs, and
   wherein the Confidence is for the UE communication prediction.

2. The method of claim 1, wherein the Namf_EventExposure_Subscribe service operation includes an Event ID, an external UE ID, an Application ID and an Area of Interest.

3. The method of claim 1, wherein the NWDAF device subscribes communication information for an application identified by an Application ID from an AF (Application Function) device for the UE.

4. The method of claim 1, wherein the NWDAF device invokes an smf_EventExposure_Subscribe including an Event ID, a SUPI, an Application ID and an Area of Interest to the SMF device.

5. The method of claim 1, wherein the NWDAF device invokes an Namf_EventExposure_Request including an Event ID and a SUPI.

6. The method of claim 1, wherein the NWDAF device retrieves a Type Allocation code from the AMF device.

7. The method of claim 3, wherein when the AF device is an external AF device, an NEF (Network Exposure Function) device translates a requested Area of Interest into a list of one or more geographic zone identifiers.

8. A system for providing UE(User Equipment) communication analysis, comprising:
   one or more processors in an NWDAF (Network Data Analytic Function) device configured to:
   receive an Nnwdaf_AnalyticsSubscription_Subscribe service operation from a NF (Network Function) device;
   invoke an Nsmf_EventExposure_Subscribe service operation to a SMF (Session Management Function) device;
   receive an Nsmf_EventExposure_Notify service operation from the SMF device;
   invoke an Namf_EventExposure_Subscribe service operation to an AMF (Access Management Function) device;
   receive an Namf_EventExposure_Notify service operation from the AMF device;
   derive UE communication analytics in a form as UE communication statistics or UE communication prediction; and provide the UE communication analytics to the NF device using an Nnwdaf_AnalyticsInfo_Request response service operation or an Nnwdaf_Analytics-Subscription_Notify service operation, wherein the UE communication statistics include a UE group ID, a UE ID, UE communications, a Periodic communication indicator, a Periodic time, a Start time, a Duration time, a Traffic characterization, a Traffic volume and a Ratio, wherein the UE communication prediction includes the UE group ID, the UE ID, the UE communications, the Periodic communication indicator, the Periodic time, the Start time, the Duration time, the Traffic characterization, the Traffic volume, a Confidence and the Ratio, wherein the UE group ID or UE ID is information for identifying the UE or a group of a plurality of UEs, wherein the UE communications is a list of communication time slots, wherein the Periodic communication indicator is information for identifying whether the UE communicates periodically or not, wherein the Periodic time is an interval time of periodic communication, wherein the Start time is an observed start time and the Duration time is a duration interval time of communication, wherein the Traffic characterization includes S-NSSAI, DNN or ports, wherein the Traffic volume is a volume of downlink or uplink, wherein the Ratio is a percentage of UEs in the group in a case of the group of the plurality of UEs, and wherein the Confidence is for the UE communication prediction.

9. The system of claim 8, wherein the Namf_EventExposure_Subscribe service operation includes an Event ID, an external UE ID, an Application ID and an Area of Interest.

10. The system of claim 8, wherein the NWDAF device subscribes communication information for an application identified by an Application ID from an AF (Application Function) device for the UE.

11. The system of claim 8, wherein the NWDAF device invokes an smf_EventExposure_Subscribe including an Event ID, a SUPI, an Application ID and an Area of Interest to the SMF device.

12. The system of claim 8, wherein the NWDAF device invokes an Namf_EventExposure_Request including an Event ID and a SUPI.

13. The system of claim 8, wherein the NWDAF device retrieves a Type Allocation code from the AMF device.

14. The system of claim 10, wherein when the AF device is an external AF device, an NEF (Network Exposure Function) device translates a requested Area of Interest into a list of one or more geographic zone identifiers.

* * * * *